United States Patent [19]

Spivack

[11] 4,186,164
[45] Jan. 29, 1980

[54] PLURAL MOLD PROCESS FOR PRODUCING NON-UNIFORM PELLICLES

[75] Inventor: Mark A. Spivack, Watchung, N.J.

[73] Assignee: Union Carbide Corporation, New York, N.Y.

[21] Appl. No.: 631,301

[22] Filed: Nov. 12, 1975

Related U.S. Application Data

[63] Continuation-in-part of Ser. No. 272,419, Jul. 17, 1972, abandoned.

[51] Int. Cl.² ............................................. B29D 7/00
[52] U.S. Cl. .................................... 264/81; 264/101; 264/310; 528/396
[58] Field of Search ............. 264/81, 1, 309, DIG. 78, 264/101, 310; 260/2 H; 427/81, 99, 102, 133, 236, 238, 248 R, 248 A, 248 H, 255, 256, 287; 428/170, 334; 425/249; 528/396

[56] References Cited

U.S. PATENT DOCUMENTS

| | | | |
|---|---|---|---|
| 3,068,510 | 12/1962 | Coleman | 264/81 |
| 3,120,450 | 2/1964 | Diefendorf et al. | 264/81 |
| 3,301,707 | 1/1967 | Loeb et al. | 427/100 |
| 3,379,803 | 4/1968 | Tittmann et al. | 264/81 |
| 3,472,795 | 10/1969 | Tittmann et al. | 427/100 |
| 3,627,569 | 12/1971 | Beecham | 427/100 |
| 3,658,954 | 4/1972 | Broadbent | 264/1 |

Primary Examiner—Jeffery R. Thurlow
Attorney, Agent, or Firm—Saul R. Bresch

[57] ABSTRACT

Pellicles of p-xylylene polymer of non-uniform thickness are prepared between a plurality of mold plates having planar or contoured mold surfaces by positioning the mold surfaces apart with respect to each other so as to form a passage therebetween, and, while providing a pattern of non-uniform pressure between, and/or temperature on, the mold surfaces, directing a stream of vapors of p-xylylene monomer through such passage so as to cause the monomer to condense and polymerize on the mold surfaces in a non-uniform manner in response to such pattern of pressure and/or temperature.

The mold plates are held stationary, and/or are rotated, in the vapor condensation zone, during the pellicle forming operation.

16 Claims, 10 Drawing Figures

FORMING PLATE A-A

SECTION A-A OF FORMED PELLICLE

PLURAL MOLD PROCESS FOR PRODUCING NON-UNIFORM PELLICLES

CROSS-REFERENCES TO RELATED PATENT APPLICATIONS

This patent application is a continuation-in-part of patent application Ser. No. 272,419 filed July 17, 1972, now abandoned.

BACKGROUND OF THE INVENTION

1. Field of the Invention

The invention relates to the preparation of pellicles of para-xylylene polymers.

2. Description of the Prior Art

Pellicles are relatively thin free-films of limited surface area. Pellicles made of para-xylylene polymers have been used in optical devices as beam splitters and for other purposes such as radiation windows; low mass supports for various types of devices such as hypervelocity particle detectors; and diffraction grating replicas.

The films may also be retained on a substrate as a coating therefor.

For many of such applications it is sometimes desirable to employ a pellicle of para-xylylene polymer which has a non-uniform cross section. Because of the nature of the process in which such polymers are usually prepared on a commercial scale, i.e., from a vaporous precursor and under vacuum conditions, and because of the delicate nature and relatively small size of the pellicles, it has not been possible to date to readily prepare a variety of pellicles having a non-uniform cross section.

SUMMARY OF THE INVENTION

It has now been found that a variety of pellicles of non-uniform cross section can be prepared from para-xylylene polymer between the surfaces of a plurality of mold plates by positioning the mold surfaces apart with respect to each other so as to form a passage therebetween, and, while providing a pattern of non-uniform pressure between, and/or temperature on, the spaced mold surfaces, directing a stream of vapors of p-xylylene monomer through the passage between such surfaces so as to cause the monomer to condense and polymerize on such surfaces in a non-uniform manner in response to such pattern of pressure and/or temperature.

An object of the present invention is to provide a process for readily preparing a variety of pellicles of p-xylylene polymer which are of non-uniform thickness.

BRIEF DESCRIPTION OF THE DRAWINGS

FIGS. 2A to 4A show side views of pellicles of non-uniform thickness which are made from the pairs of mold plates shown in FIGS. 2 to 4, respectively, when the mold plates are rotated during the formation of the pellicles.

FIGS. 2B to 4B show side views of pellicles of non-uniform thickness which are made from the pairs of mold plates shown in FIGS. 2 to 4, respectively, when the mold plates are held stationary during the formation of the pellicles.

DESCRIPTION OF THE PREFERRED EMBODIMENT

1. The Pellicles

Figure 1:
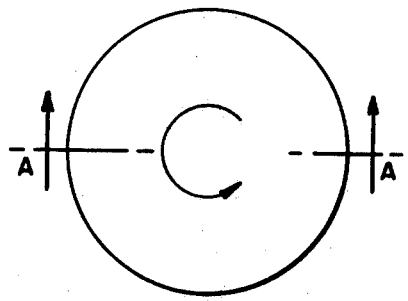
FIG. 1 shows a top view of the mold plates that may be used in the process of the present invention.

The pellicles which are prepared in the process of the present invention are films or pellicles of para-xylylene polymers which have a non-uniform thickness in the range of between about 0.025 and about 50, and preferably in the range of about 0.1 to 25, microns. These pellicles, for the purposes of the present invention, have a total surface area, on each major or principal face thereof, of about $\geq 25$ square millimeters, and preferably of about 100 to 2,500 square centimeters.

The mass of a pellicle will vary depending on the thickness of the films and the density of the polymer which is used to form the film. The para-xylylene polymers which are used to form the films have densities of the order of about 1.0 to 1.5.

The pellicles will have a contoured shape on at least one, and possibly both, of their principal surfaces. One of the two principal surfaces of the pellicles will have the shape of the surface of the mold plate on which the pellicle is formed. The shape of at least one of the two principal surfaces of the pellicles will also be determined by the non-uniform pattern of pressure between the plates, and/or by the non-uniform pattern of temperature on the surfaces of the plates.

2. Pellicle Forming Operation

2A. Background—General Preparation of Para-xylylene Polymers

Linear para-xylylene polymers are usually prepared by condensing, in a condensation zone, vapors of p-xylylene monomer which can be produced by the pyrolytic cleavage, in a pyrolysis zone, of one or more cyclic dimers represented by the following structure

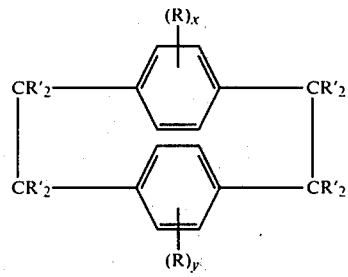

wherein R is an aromatic nuclear substituent, x and y are each integers from 0 to 3, inclusive, and R' is H, Cl and/or F. The thus formed vaporous monomers may be in the form of diradicals having the structures

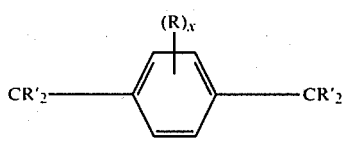

and

-continued

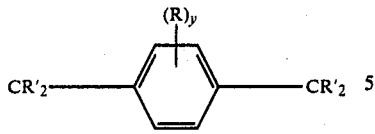

and/or moieties having the tetraene or quinoid structures:

and

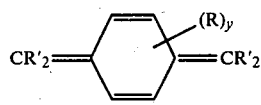

It is believed that the tetraene or quinoid structure is the dominant structure which results when the dimer is pyrolyzed, but that the monomer polymerizes as though it where in the diradical form.

Thus, where x and y are the same, and the aromatic nuclear substituent on each monomer is the same, and all the R's are the same, two moles of the same p-xylylene monomer are formed, and when condensed, yield a substituted or unsubstituted p-xylylene homopolymer. When x and y are different or the aromatic nuclear substituents on each monomer are different, or the R's are different, condensation of such monomers will yield copolymers as hereinafter set forth. Examples of the R substituent groups which may be present in the dimers and monomers are organic groups such as alkyl, aryl, alkenyl, cyano, alkoxy, hydroxy alkyl, carbalkoxy and like radicals and inorganic radicals such as hydroxyl, halogen and amino groups. COOH, $NO_2$ and $SO_3H$ groups may be added as R groups to the polymer after it is formed. The unsubstituted positions on the aromatic rings are occupied by hydrogen atoms.

The particularly preferred substituent R groups are the $C_1$ to $C_{10}$ hydrocarbon groups, such as the lower alkyls, i.e., methyl, ethyl, propyl, butyl and hexyl, and aryl hydrocarbons such as phenyl, alkylated phenyl, naphthyl and like groups; and the halogen groups, chlorine, bromine, iodine and fluorine. Hereinafter the term "a di-p-xylylene" refers to any substituted or unsubstituted cyclic di-p-xylylene as hereinabove discussed.

Condensation of the monomers to form the p-xylylene polymers can be accomplished at any temperature below the decomposition temperature of the polymer, i.e., at <250° C. The condensation of the monomers will proceed at a faster rate, the colder is the substrate on which the condensation is to take place. Above certain temperatures, which might be defined as a ceiling condensation temperature, the monomers will only condense at rates which are relatively slow for commercial applications. Each monomer has a different ceiling condensation temperature. For example, at 0.5 mm Hg pressure the following condensation and polymerizations ceilings are observed for the following monomers:

|  | Degrees centigrade |
|---|---|
| p-Xylylene | 25–30 |
| Chloro-p-xylylene | 70–80 |
| Cyano-p-xylylene | 120–130 |
| n-Eutyl-p-xylylene | 130–140 |
| Iodo-p-xylylene | 180–200 |

Thus, homopolymers may be made by maintaining the substrate surface at a temperature below the ceiling condensation temperature of the particular monomer species involved, or desired in the homopolymer. This is most appropriately termed "homopolymerizing conditions".

Where several different monomers existing in the pyrolyzed mixture have different vapor pressure and condensation characteristics as for example p-xylylene, or cyano-p-xylylene and chloro-p-xylyene, or any other mixutre thereof with other substituted monomers, homopolymerization will result when the condensation and polymerization temperature is selected to be at or below that temperature at which only one of the monomers condenses and polymerizes. Thus, for the purposes of this invention the term "under homopolymerization conditions" is intended to include those conditions where only homopolymers are formed.

Therefore it is possible to make homopolymers from a mixture containing one or more of the substituted monomers when any other monomers present have different condensation or vapor pressure characteristics, and wherein only one monomer species is condensed and polymerized on the substrate surface. Of course, other monomer species not condensed on the substrate surface can be drawn through the apparatus as hereinafter described in vaporous form to be condensed and polymerized in a subsequent cold trap.

Inasmuch as the p-xylylene monomers, for example, are condensed at temperatures of about 25° to 30° C., which is much lower than that at which the cyano p-xylylene monomers condense, i.e., about 120° to 130° C., it is possible to have such p-xylylene monomers present in the vaporous pyrolysed mixture along with the cyano-substituted monomers when a homopolymer of the substituted dimer is desired. In such a case, homopolymerizing conditions for the cyano p-xylylene monomers are secured by maintaining the substrate surface at a temperature below the ceiling condensation temperature of the substituted p-xylylene but above that of the unsubstituted p-xylylene, thus permitting the unsubstituted p-xylylene vapors to pass through the apparatus without condensing and polymerizing, but collecting the poly-p-xylylene in a subsequent cold trap.

It is also possible to obtain substituted copolymers through the pyrolysis process hereinabove described. Copolymers of p-xylylene and substituted p-xylylene monomers, as well as copolymers of substituted p-xylylene monomers wherein the substituted groups are all the same radicals but wherein each monomer contains a different number of substituent groups, can all be obtained through such pyrolysis process.

Copolymerization also occurs simultaneously with condensation, upon cooling of the vaporous mixture of reactive monomers to a temperature below about 200° C. under polymerization conditions.

Copolymers can be made by maintaining the substrate surface at a temperature below the ceiling condensation temperature of the lowest boiling monomer desired in the copolymer, such as at room temperature or below. This is considered "copolymerizing conditions", since at least two of the monomers will condense and copolymerize in a random copolymer at such temperature.

In the pyrolytic process, the reactive monomers are prepared by pyrolyzing a substituted and/or unsubstituted di-para-xylylene at a temperature less than about 750° C., and preferably at a temperature between about 600° C. to about 680° C. At such temperatures, essentially quantitative yields of the reactive monomers are secured. Pyrolysis of the starting di-p-xylylene begins at about 450° C. regardless of the presssure employed. Operation in the range of 450°–550° C. serves only to increase the time of reaction and lessen the yield of polymer secured. At temperatures above about 750° C., cleavage of the substituent group can occur, resulting in a tri-/or polyfunctional species causing cross-linking or highly branched polymers.

The pyrolysis temperature is essentially independent of the operating pressure. It is preferred, however that reduced or subatmospheric pressures be employed. For most operations, pressures within the range of 0.0001 to 10 mm. Hg absolute are most practical. However, if desired, greater pressures can be employed. Likewise, if desirable, inert vaporous diluents such as nitrogen, argon, carbon dioxide, steam and the like can be employed to vary the optimum temperature of operation or to change the total effective pressure in the system.

2B. Preparation of Pellicles of Non-Uniform Thickness

The pellicle forming operation of the present invention wherein pellicles of non-uniform thickness are formed is conducted in a condensation zone. The pellicles are formed between the surfaces of a plurality of mold plates, which are arranged in the condensation zone between a source of monomer and an exhaust pump, so as to provide a passage between such surfaces for the flow of monomer therethrough.

The mold plates may be made of materials which are stable in a vacuum under the conditions employed in the process of the present invention, and include materials such as vitreous materials including glass, ceramics and porcelain; metals such as aluminum, iron, nickel, copper, magnesium, silver, tin and alloys and compounds of such metals such as steel, brass and bronze; and metalloids such as silicon and germanium.

In a horizontal plane, the surfaces of the mold plates on which the pellicles are to be formed may be planar or non-planar. In the vertical plane, the surfaces of the mold plates may have any configuration such as circular or rectangular.

During the pellicle forming operation the mold plates may be held stationary, or one or more of them may be rotated. Different shaped pellicles may be obtained from the same set of mold plates depending on whether the plates are rotated or not during the pellicle forming operation. A pellicle forms on the surface of each of the mold plates forming the passage therebetween during the pellicle forming operation. The pellicles formed on the mold plates may have the same or a different configuration depending on the configuration of the surfaces of the plates and whether or not the plates are rotated during the pellicle forming operation.

FIG. 1 shows a top view of pairs of circular mold plates indicating the direction of rotation of the plates (where applicable) which may be used in the process of the present invention.

Figure 2:
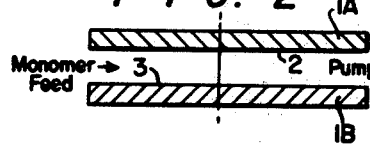
FIGS. 2 to 4 show side views of various pairs of mold plates in position in a condensation zone, when in use in the process of the present invention.
Figure 3:
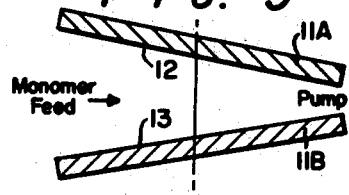
Figure 4:
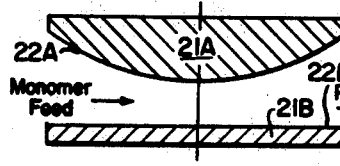

FIGS. 2 to 4 show side views of various pairs and arrangements of circular mold plates, through section A-A of the mold plates of FIG. 1, as they are positioned in the condensation zone between a source of monomer and an exhaust pump in accordance with various embodiments of the present invention. During the pellicle forming operation in the process of the present invention the monomer, in vapor form, is caused to pass from the monomer source, between the mold plates, and towards the exhaust pump.

FIGS. 2A to 4A show the shapes of pellicles that may be prepared with the mold plates of FIGS. 2 to 4, respectively, in accordance with the process of the present invention, when the mold plates are rotated as shown in FIG. 1 during the pellicle forming process.

FIGS. 2B to 4B show the shapes of pellicles that may be prepared with the mold plates of FIGS. 2 to 4, respectively, in accordance with the present invention, when the mold plates are held stationary during the pellicle forming process.

The thicknesses of the pellicles shown in FIGS. 2A to 4A and in FIGS. 2B to 4B are drawn to scale both within themselves and between each other.

FIG. 2 shows a pair of mold plates 1A and 1B which have planar circular mold surfaces 2 and 3, respectively. Mold plates 1A and 1B are arranged so that surfaces 2 and 3 are substantially parallel to each other and spaced apart about 0.025 to 10 millimeters. The space between surfaces 2 and 3 forms an essentially rectangular shaped passage through which monomer is caused to flow towards the exhaust pump. In order to cause the formation of pellicles of non-uniform thickness in accordance with the process of the present invention, a pattern of non-uniform pressure is created in the passage between mold plates 1A and 1B, or variations in temperature are provided on the deposition surfaces of one or both of the mold plates. The non-uniform pressure pattern is primarily created by the shape or configuration of the passage provided between the mold plates. It may also be created and/or enhanced by the direction of the monomer feed, the location and manifolding of exhaust port for the exhaust pump, the rate of monomer feed to the deposition zone, the pumping capacity of the system, and the temperature of the deposition surfaces of the mold plates.

The non-uniform temperature pattern may be provided on the surfaces of the mold plates by appropriately positioned heating and/or cooling means.

The straight but constricted passage between mold plates 1A and 1B provided by the arrangement of mold surfaces 2 and 3 as shown in FIG. 2 usually provides a non-uniform pattern of pressure in such passage wherein essentially a higher pressure prevails at each of the two ends of the passage between the plates, and the lowest pressure prevails at the center of the passage, and there is the same gradation of pressure between the center of the passage and the two ends of the passage.

Figure 2A:
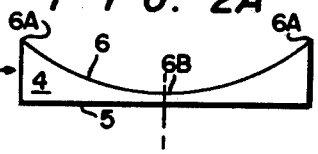

When plates 1A and 1B are rotated during the formation of the pellicles a symmetrically shaped pellicle 4, as shown in FIG. 2A, is formed on each of faces 2 and 3 of plates 1A and 1B. The bottom flat side 5 of pellicle 4, deposits on the flat surface of the mold plates, and the curved pattern of the upper surface 6 of pellicle 4 forms in direct response to the non-uniform pattern of pressure in the passage between the two plates. The sum of the heights of the thickest portions of each of the two pellicles 4, i.e., their end portions 6A, represents up to about 100% of the distance between surfaces 2 and 3 of mold plates 1A and 1B. The thinnest portions 6B of pellicles 4 are generally about ⅓ the height of the thickest end portions, depending on the geometry of, and between, the mold surfaces.

Figure 2B:
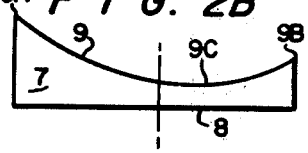

When plates 1A and 1B are held stationary during the formation of the pellicles, a non-symmetrical pellicle 7, as shown in FIG. 2B, is formed on each of faces 2 and 3 of plates 1A and 1B. The bottom flat side 8 of pellicle 7 deposits on the flat surfaces of the mold plates, and the curved pattern of the upper surface 9 of pellicle 7 forms in direct response to the non-uniform pattern of pressure in the passage between the two plates. The sum of the heights of the thicker ends of each of the two pellicles 7, i.e., the ends 9A formed nearest the monomer feed, represents up to about 100% of the distance between surfaces 2 and 3 of mold plates 1A and 1B. The sum of the heights of the narrower ends 9B of each of the two pellicles 7, represents up to about 80% of the distance between surfaces 2 and 3 of mold plates 1A and 1B. The thinnest or center portions 9C of each of the two pellicles 7 are generally about ⅓ the height of the thickest end portions, depending on the geometry of, and between, the mold surfaces.

FIG. 3 shows a pair of mold plates 11A and 11B which have planar circular mold surfaces 12 and 13, respectively. Mold plates 11A and 11B are arranged so that surfaces 12 and 13 are arranged at an angle of about 30° with respect to each other so as to provide the trapezoidal shaped path shown in FIG. 3 for the passage of monomer therethrough from the source thereof towards the exhaust pump. Plates 11A and 11B are spaced about 0.4 to 10 millimeters apart at the widest end of the trapezoid, and about 0.025 to 8 millimeters apart at the narrowest end of the trapezoid.

In order to cause the formation of pellicles of non-uniform thickness in accordance with the process of the present invention, a pattern of non-uniform pressure is created in the trapezoid shaped passage between plates 11A and 11B, or variations in temperature are provided on the deposition surfaces of one or both of the mold plates. The non-uniform pressure pattern is readily created by the shape or configuration of the passage provided between plates 11A and 11B as shown in FIG. 3. During the flow of vapors of monomer through such passage there arises a pattern of pressure wherein the highest pressure is at the entrance to the passage adjacent the source of monomer and the lowest pressure is at a point about ¾ of the way through the passage. A slight rise in pressure prevails at the exit end of the passage. This pressure pattern is caused by a combination of the pressure between plates 11A and 11B and the pressure variations within the condensing zone external to the passage between plates 11A and 11B.

Figure 3A:
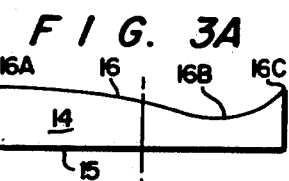
Figure 3B:
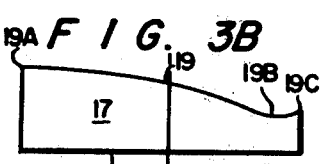

When plates 11A and 11B are rotated during the formation of the pellicles a non-symmetrical pellicle 14, as shown in FIG. 3A, is formed on each of the surfaces 12 and 13 of plates 11A and 12A. The bottom flat surface 15 of pellicle 14 deposits on the flat surface of the mold plates, and the curved or contoured top surface 16 of pellicle 14 forms in direct response to the non-uniform pattern of pressure in the passage between the two plates. The sum of the heights of the thickest portions of each of the two pellicles 14, i.e., at end 16A, represents up to about 80% of the widest distance between surfaces 12 and 13 of mold plates 11A and 11B. The thinnest portions of the pellicles 14, at point 16B, is about ⅓ the height of the thickest end. The sum of the heights of the shorter ends 16C of each of two pellicles 14 represents up to about 100% of the narrowest distance between surfaces 12 and 13 of mold plates 11A and 11B.

When plates 11A and 11B are held stationary during the formation of the pellicles a non-symmetrical pellicle 17, as shown in FIG. 2B is formed on each of faces 12 and 13 of plates 11A and 11B. The bottom flat sides 18 deposits on the flat surfaces of the mold plates and the curved pattern of the upper surface 19 of pellicle 17 forms in direct response to the non-uniform pattern of pressure in the passage between the two plates. The sum of the heights of the thicker ends 19A of each of the pellicles 19 represents up to about 100% of the widest distance between surfaces 12 and 13 of mold plates 11A and 11B. The thinnest portions of the pellicles 17, i.e., at point 19B, is about ⅓ of the height of the thickest end 19A. The sum of the heights of the shorter ends 19C of each of two pellicles 17 represents up to about 100% of the narrowest distance between surfaces 12 and 13 of mold plates 11A and 11B.

FIG. 4 shows a pair of circular mold plates 21A and 21B which may also be used to prepare pellicles of non-uniform thickness in the process of the present invention. Plate 21A has a curved surface 22A, and plate 21B has a flat surface 22B, between which the non-uniform pellicles are formed by passing a stream of monomer from the monomer source towards the exhaust pump. Pellicles will form on both of surfaces 22A and 22B. Mold plates 21A and 21B are positioned with respect to each other so that, at their closest points, i.e., in the center of the passage between them, they are spaced apart about 0.025 to 5 millimeters. They are spaced apart, at each of the ends of the passage between them, about 0.05 to 10 millimeters.

The non-planar or contoured shape of mold surface 22A is primarily responsible for the desired non-uniform pattern of pressure that arises in the passage between plates 21A and 21B during the flow of monomer through such passage. The pressure will be at its lowest in the center of the passage, and at its highest at the ends of the passage, with the same gradation in pressure between the center of the passage and each of its two ends.

Figure 4A:
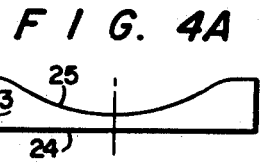

When plates 21A and 21B are rotated during the formation of the pellicles a symmetrically shaped pellicle 23, as shown in FIG. 4A, is formed on surface 22B of lower plate 21B. The bottom flat surface 24 of pellicle 23 deposits on the flat surface 22B of plate 21B, and the curved upper surface 25 of pellicle 23 forms in direct response to the non-uniform pattern of pressure in the passage between the two plates.

The pellicle that forms on the curved surface 22A of plate 21A while the plates are rotated is not shown. It is not a mirror image of pellicle 23, since it does not have a flat side. Rather, the pellicle that forms on surface 22A of plate 21A has the shape of a shallow bell, being curved on both sides and having the degree of curvature exhibited by the surface 25 of pellicle 23 and that of surface 22A of plate 21A. At its center, it will have the thickness of the thinnest part of pellicle 23.

Figure 4B:
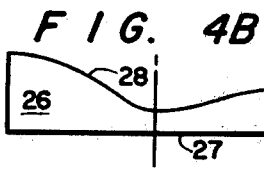

When plates 21A and 21B are held stationary during the formation of the pellicles a non-symmetrically shaped pellicle 26, as shown in FIG. 4B, is formed on surface 22B of lower plate 21B. The bottom flat surface 27 of pellicle 26 deposits on the flat surface 22B of plate 21B, and the curved upper surface 28 of pellicle 26 forms in direct response to the non-uniform pattern of pressure in the passage between the two plates.

The pellicle that forms on the curved surface 22A of plate 21A while the plates are held stationary is not shown. It is not a mirror image of pellicle 26, since it does not have a flat side. Rather, the pellicle that forms on surface 22A of plate 21A has a curved shape on both sides, the curvature of which conforms to that of the surface 22A of plate 21A. At its thinnest part, it will have the thickness of the thinnest part of pellicle 26.

During the pellicle forming operation the pellicles will form uniformly, i.e., at the same rate of deposition, on each of the surfaces of the mold plates that form the passage between the mold plates, as long as the temperature of such surfaces is essentially the same. The rate of deposition on each plate can also be varied by modifying the temperature of the plate. The pellicles will continue to build up on each of the plates until the passage between the plates becomes clogged by the formed pellicles. Thus, each of the pellicles can be prepared in virtually any thickness, as measured at their thickest points, which generally represents up to about ½ the distance at the point between the two mold surfaces at which such thickest portions of the pellicles are formed.

Pellicles having virtually any cross-sectional configuration can be prepared in the process of the present invention, starting with a design of the desired pellicle. Using such design as a goal, one then prepares mold plates having surfaces that will either be mirror images of the desired configurations, as in the case of mold plates 21A and pellicle 23, or which will provide a pressure pattern in the monomer flow passage which will cause the formation of the desired pellicle, as in the case of the formation of the other pellicles disclosed in the drawings.

When the mold plates are rotated they are usually rotated at a speed of about 1 to 10 revolutions per minute. The pellicle forming operation usually requires about 0.1 to 10 hours depending on the desired thickness of the pellicles.

Although each drawing shows the use of a pair of mold plates, more than two mold plates can be used to form the desired passageway between the source of monomer and the vacuum pump. The process of the present invention may then be generally summarized to be a process for producing pellicles of non-uniform thickness between a plurality of mold plates, each of such mold plates having a mold surface, which comprises, positioning the mold plates with respect to each other so that such mold surfaces form a passage therebetween, providing a pattern of non-uniform pressure within such passage, directing a stream of vapors of p-xylylene monomer through such passage, and causing said monomer to condense and polymerize on at least one of such surfaces in response to such pattern of pressure, so as to thereby provide on at least one of such surfaces a pellicle of non-uniform thickness, the pattern of such non-uniform thickness in such pellicles being directly proportional to the pattern of such pressure.

The following examples are merely illustrative of the present invention and are not intended as a limitation upon the scope thereof.

EXAMPLES 1-5

A series of five pairs of pellices were formed using the mold arrangement shown in FIG. 2. In each experiment a pellicle was formed on each of the two circular mold surfaces 2 and 3 which had the configuration of pellicle 4 as shown in FIG. 2A. The thickness of the pellicles was varied in each experiment.

For each experiment two flat circular glass plates, ~10 centimeters in diameter, which had been cleaned and wiped with a soap based release agent on each pellicle forming surface, were used as the mold plates. Three spacers, each approximately 1 mm square, were cemented equidistant from each other on the periphery of the pellicle forming surface of one of the plates. The spacers varied in thickness in each experiment, from 0.038 mm to 6 mm. The second glass plate was then cemented to the spacers in line with the first plate, so as to form a hollow sandwich construction, with a passageway therebetween. The bonded plates were then placed in a holding fixture, which suspended the cemented plates on the periphery thereof, and the suspended plates were then positioned within a 9" deposition chamber so that the hollow passage between the plates was aligned parallel to the general flow of monomer vapor. The deposition chamber was provided with a vent for monomer input opposite a vent for exhausting unused monomer towards a vacuum pump. Pellicles were formed in the five experiments while the suspended plates were rotated at a speed of about 6 RPM. The monomer used in the experiments was chloro-p-xylylene, and pellicles of poly(chloro-p-xylylene) having the configuration shown in FIG. 2A formed on each of the two surfaces of the plates forming the passageway. The coating operations were conducted in each case under at a temperature of about 25° C. and at a monomer pressure within the coating chamber of about 60 to 75 millitorr. The pressure between the plates was somewhat lower than the overall pressure in the deposition chamber. The monomer was fed to the deposition chamber in each case at a rate of feed of about 0.25 grams per minute. The polymer formed on each of the two deposition surfaces of the plates at the rate of about 0.01 to 0.15 μm per minute.

After the deposition was complete the two mold plates were removed from the deposition chamber and separated, and a mounting ring was adhesively attached to each pellicle to facilitate its removal from the mold plates. The pellicles were then stripped from the plates, held on the ring supports, by water immersion. The thickness of the center of the resulting pellicles was measured using an optical interference method. The thicknesses of such pellicles (at their centers) as well as the spacing between the mold plates used to make such pellicles, and other process parameters are listed below in Table I.

TABLE I

| Pellicle of Example | Spacing between plates millimeters | Thickness of pellicle at its center (μm) | Thickness of pellicle at its edges (μm) | Pressure in deposition chamber millitorr | Total monomer charge, grams | Deposition time, minutes |
|---|---|---|---|---|---|---|
| 1 | 0.38 | 1.0 | ~15 | 68-73 | 20 | ~90 |
| 2 | 0.76 | 2.4 | ~15 | 68-73 | 20 | ~90 |

TABLE I-continued

| Pellicle of Example | Spacing between plates millimeters | Thickness of pellicle at its center (μm) | Thickness of pellicle at its edges (μm) | Pressure in deposition chamber millitorr | Total monomer charge, grams | Deposition time, minutes |
| --- | --- | --- | --- | --- | --- | --- |
| 3 | 1.62 | 7.2 | ~15 | 68–73 | 20 | ~90 |
| 4 | 1.02 | 3.0 | ~13 | 60–65 | 16 | ~120 |
| 5 | 1.30 | 4.3 | ~13 | 60–65 | 16 | ~120 |

EXAMPLE 6

A pair of pellicles was formed using the mold arrangement shown in FIG. 3. In this experiment a pellicle was formed on each of the two circular mold surfaces 12 and 13 which had the configuration of pellicle 14 as shown in FIG. 3A.

For this experiment two flat circular glass plates, ~10 centimeters in diameter, which had been cleaned and wiped with a soap based release agent on each pellicle forming surface, were used as the mold plates. Three spacers, each approximately 1 mm square, were cemented equidistant from each other on the periphery of the pellicle forming surface of one of the plates. The spacers varied in thickness but were such, when the second plate was cemented to the spacers, in line with the first plate, as to form a trapezoidal shaped passage between the two plates, as shown in FIG. 3. The passage was 1.5 millimeters wide at its widest end and 0.4 millimeters wide at its narrowest end. The bonded plates were then placed in a holding fixture, which suspended the cemented plates on the periphery thereof, and the suspended plates were then positioned within a 9" deposition chamber so that the hollow passage between the plates was aligned parallel to the general flow of monomer vapor. The deposition chamber was provided with a vent for monomer input opposite a vent for exhausting unused monomer towards a vacuum pump. Pellicles were formed in this experiment while the suspended plates were rotated at a speed of about 6 RPM. The monomer used in the experiment was chloro-p-xylylene, and pellicles of poly(chloro-p-xylylene) having the configuration shown in FIG. 3A formed on each of the two surfaces of the plates forming the passageway. The coating operations were conducted in each case under at a temperature of about 25° C. and at a monomer pressure within the coating chamber of about 70 millitorr. The pressure between the plates was somewhat lower than the overall pressure in the deposition chamber. The monomer was fed to the deposition chamber in each case at a rate of feed of about 0.25 grams per minute so as to provide a total monomer charge of 20 grams. The polymer formed on each of the two deposition surfaces of the plates at the rate of about 0.01 to 0.15 μm per minute. The total deposition time was about 100 minutes.

After the deposition was complete the two mold plates were removed from the deposition chamber and separated, and a mounting ring was adhesively attached to each pellicle to facilitate its removal from the mold plates. The pellicles were then stripped from the plates, held on the ring supports, by water immersion. The thickness of the center of the resulting pellicles was measured using an optional interference method. The resulting pellicles were about 15 μm thick at their edges (points 16A and 16C as shown in FIG. 3A) and about 4.5 μm thick at a point 3 cm from the center of the pellicle (point 16B as shown in FIG. 3A). As noted above, during the pellicle forming operation, the mold plates on which the pellicles are formed may be held stationary or they may be rotated, in the condensation zone in which the pellicles are formed from the condensing vapors of the p-xylylene monomers. Thus, all of the mold plates may be held stationary in such zone, or one or more of the mold plates may be rotated in such zone, while the remainder, if any, are held stationary. Thus, in all cases, each of the stationary and rotating mold plates is kept entirely within the condensation zone during the entire pellicle forming operation.

When any one of the mold plates is rotated, it is rotated around an axis which runs through the surface of the mold plate on which the pellicle is to be formed. Where such surface is a flat surface, such axis is usually perpendicular to such flat surface. Where such surface of the mold plate is not flat, the axis around which the mold plate rotates is usually perpendicular to a flat plane which best describes the average orientation of said non-flat surface. By the average orientation of said non-flat surface is meant an artifically drawn plane which represents the average cross-sectional height of the entire non-flat surface when viewed in a horizontal plane.

What is claimed is:

1. A process for producing pellicles of non-uniform thickness between a plurality of mold plates, each of said mold plates in a zone for condensing vapors of p-xylylene monomer under vacuum forming conditions, each of said mold plates being mounted for selectable rotational movement about an axis which runs through its mold surface and is fixed within said zone, which comprises, positioning said mold plates with respect to each other so that at least two of said mold surfaces form a passage between their surfaces which face each other, providing a pattern of non-uniform pressure within said passage, directing a stream of vapors of p-xylylene monomer through said passage between the passage-forming mold surfaces, and causing said monomer to condense and polymerize on at least one of said passage-forming surfaces in response to said pattern of pressure, so as to thereby provide on at least one of said passage-forming surfaces a pellicle of non-uniform thickness, the pattern of said non-uniform thickness in said pellicles being directly proportional to the pattern of said pressure.

2. A process as a claim 1 in which said passage is at least 0.025 to 10 millimeters wide.

3. A process as in claim 1 in which at least one of said passage-forming, mold surfaces is planar.

4. A process as in claim 3 in which all of said passage-forming, mold surfaces are planar.

5. A process as in claim 4 in which said mold plates form a rectangular shaped passage therebetween.

6. A process as in claim 5 in which two of said mold surfaces are used and they are positioned essentially parallel to each other.

7. A process as in claim 6 in which at least one of said mold plates is rotated during the pellicle forming operation.

8. A process as in claim 6 in which all of said mold plates are held stationary during the pellicle forming operation.

9. A process as in claim 4 in which at least two of said passage-forming, mold surfaces are positioned so as to be angularly disposed towards each other.

10. A process as in claim 9 in which said mold plates form a trapezoidal shaped passage therebetween.

11. A process as in claim 10 in which at least one of said mold plates is rotated during the pellicle forming operation.

12. A process as in claim 10 in which all of said mold plates are held stationary during the pellicle forming operation.

13. A process as in claim 3 in which one of said passage-forming, mold surfaces is non-planar.

14. A process as in claim 13 in which at least one of said mold plates is rotated during the pellicle forming operation.

15. A process as in claim 13 in which all of said mold plates are held stationary during the pellicle forming operation.

16. A process as in claim 1 in which the pattern of pressure between the passage-forming mold surfaces is primarily a function of the configuration and arrangement of such surfaces.

* * * * *

UNITED STATES PATENT AND TRADEMARK OFFICE
CERTIFICATE OF CORRECTION

PATENT NO. : 4,186,164
DATED : January 29, 1980
INVENTOR(S) : Mark A. Spivack

It is certified that error appears in the above-identified patent and that said Letters Patent are hereby corrected as shown below:

Column 12, line 37, before "said mold plates", insert --said mold plates having a mold surface, while maintaining--; line 61, change "a" (lower case) to --in--.

Signed and Sealed this

Twentieth Day of May 1980

[SEAL]

Attest:

SIDNEY A. DIAMOND

Attesting Officer     Commissioner of Patents and Trademarks